(12) United States Patent
Mueller et al.

(10) Patent No.: US 9,702,429 B2
(45) Date of Patent: Jul. 11, 2017

(54) TORSIONAL VIBRATION ABSORBER

(71) Applicant: TrelleborgVibracoustic GmbH, Darmstadt (DE)

(72) Inventors: Niklas Mueller, Freiburg (DE); Juergen Reitz, Deutsch Evern (DE)

(73) Assignee: TRELLEBORGVIBRACOUSTIC GMBH, Darmstadt (DE)

( * ) Notice: Subject to any disclaimer, the term of this patent is extended or adjusted under 35 U.S.C. 154(b) by 222 days.

(21) Appl. No.: 14/542,673

(22) Filed: Nov. 17, 2014

(65) Prior Publication Data
US 2015/0137437 A1 May 21, 2015

(30) Foreign Application Priority Data

Nov. 21, 2013 (DE) .......................... 10 2013 112 854

(51) Int. Cl.
*F16F 15/12* (2006.01)
*F16F 15/124* (2006.01)

(52) U.S. Cl.
CPC ................................. *F16F 15/124* (2013.01)

(58) Field of Classification Search
CPC ... F16F 15/124; F16F 15/1245; F16F 15/1442
See application file for complete search history.

(56) References Cited

U.S. PATENT DOCUMENTS

| | | | | |
|---|---|---|---|---|
| 4,914,949 A * | 4/1990 | Andra | ................. | F16F 15/1202 464/87 |
| 5,138,902 A * | 8/1992 | Muller | ................ | F16F 15/1442 192/201 |
| 5,352,157 A * | 10/1994 | Ochs | ................... | F16F 15/1435 464/180 |
| 6,837,345 B1 * | 1/2005 | Lauble | ................... | F16F 1/371 188/378 |
| 7,748,689 B2 * | 7/2010 | Thibault | ............... | F16F 1/3807 267/140.12 |
| 8,091,450 B2 * | 1/2012 | Manzoor | ............ | F16F 15/1428 464/73 |
| 2003/0040370 A1 * | 2/2003 | Gartner | ............... | F16F 15/1442 464/180 |
| 2011/0118037 A1 * | 5/2011 | Akachi | .................. | B60K 17/24 464/180 |
| 2013/0126285 A1 | 5/2013 | Loew et al. | | |
| 2013/0210533 A1 | 8/2013 | Kobus et al. | | |
| 2015/0252873 A1 * | 9/2015 | Scheper | .............. | F16F 15/1442 188/378 |

FOREIGN PATENT DOCUMENTS

| | | |
|---|---|---|
| DE | 102008052902 A1 | 4/2010 |
| DE | 102009029140 B4 | 4/2011 |
| DE | 102010008760 A1 | 8/2011 |
| DE | 102010009411 A1 | 9/2011 |

* cited by examiner

*Primary Examiner* — Bradley King
(74) *Attorney, Agent, or Firm* — Leydig, Voit & Mayer, Ltd.

(57) ABSTRACT

A torsional vibration absorber comprising a hub for attachment to a shaft and an oscillating ring. The oscillating ring is disposed concentrically with the hub and, together with the hub, delimits an annular gap. The hub and the oscillating ring are connected via connecting members made from an elastomeric material. The connecting members are offset in a circumferential direction and disposed in the annular gap. The connecting members include a bead-shaped middle portion, which is connected to the oscillating ring and to the hub via thin webs.

12 Claims, 5 Drawing Sheets

TORSIONAL VIBRATION ABSORBER

CROSS-REFERENCE TO RELATED APPLICATIONS

Priority is claimed to German Patent Application No. DE 10 2013 112 854.8, filed on Nov. 21, 2013, the entire disclosure of which is hereby incorporated by reference herein.

FIELD

The invention relates to a torsional vibration absorber, in particular for a joint shaft, comprising a hub for attachment to a shaft and an oscillating ring disposed concentrically with the hub.

BACKGROUND

Torsional vibration absorbers of this type are used, for example, in motor vehicles for damping torsional vibrations of shafts rotating at high rotational speed. Such a torsional vibration absorber is disclosed, for example, by DE 10 2009 029 140 B4.

SUMMARY

In an embodiment, the present invention provides a torsional vibration absorber comprising a hub for attachment to a shaft and an oscillating ring. The oscillating ring is disposed concentrically with the hub and, together with the hub, delimits an annular gap. The hub and the oscillating ring are connected via connecting members made from an elastomeric material. The connecting members are offset in a circumferential direction and disposed in the annular gap. The connecting members include a bead-shaped middle portion, which is connected to the oscillating ring and to the hub via thin webs.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
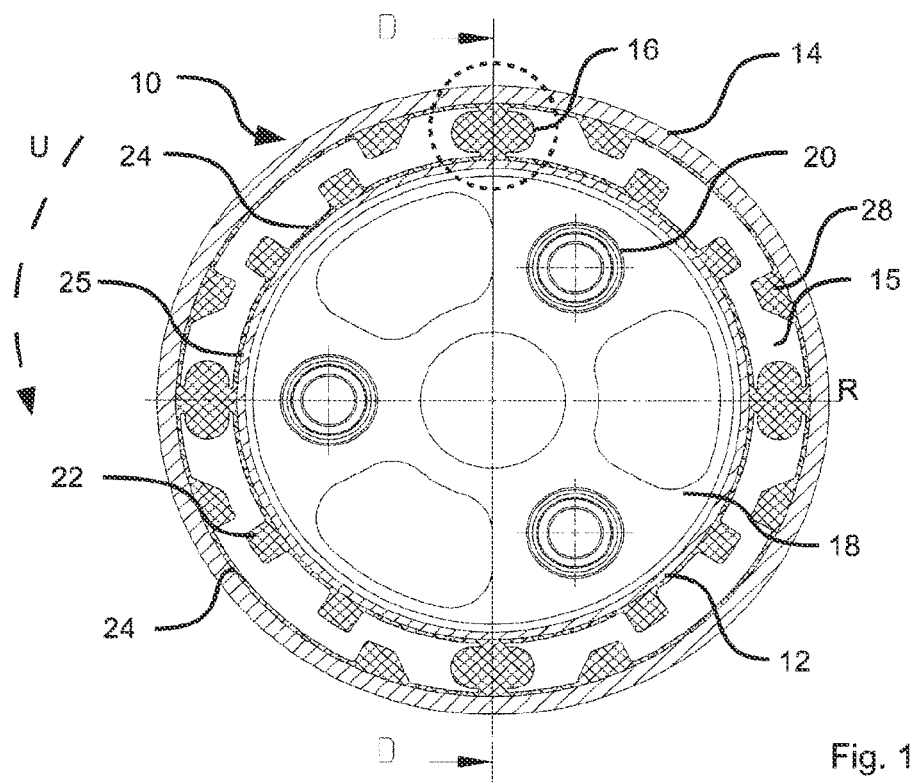
FIG. 1 shows a cross sectional view of a torsional vibration absorber.

An aspect of the invention is to provide an improved torsional vibration absorber.

The torsional vibration absorber according to the invention, which is suitable, in particular, for a joint shaft, has a hub for attachment to a shaft and an oscillating ring that is disposed concentrically with the hub and, together with the latter, delimits an annular gap. The hub and the oscillating ring are connected via connecting members of an elastomeric material that are offset in the circumferential direction and disposed in the annular gap. The connecting members have a bead-shaped middle portion, which, via thin webs, is connected to the oscillating ring on the one hand and to the hub on the other hand.

The hub can be attached, for example, to a joint shaft of, for instance, a motor vehicle. In particular, the hub is press-fitted to the shaft or attached to the shaft by means of an attachment portion using attachment members, such as screws or bolts, for instance. The attachment is preferably rigid. In an unloaded state of the torsional vibration absorber, the oscillating ring is disposed concentrically with the hub and forms an annular gap with respect to the hub. In order to reduce torsional vibrations on the shaft, the oscillating ring moves both in the circumferential direction and in the radial direction relative to the hub. The terms "circumferential direction" and "radial direction" relate to the extent of the shaft.

When the oscillating ring is deflected relative to the hub in the radial direction, the annular gap changes in such a way that the distance to the hub is increased towards one side in the direction of the deflection and reduced towards the other side. If the oscillating ring is deflected in the circumferential direction relative to the hub, the annular gap preferably does not change.

Most frequently, unwanted vibrations occur simultaneously both in the radial direction and in the circumferential direction. Absorption takes place because of the inertia of the movement of the oscillating ring in relation to the movement of the hub which, in particular, is firmly connected to the shaft. Absorption takes place in particular in the region of the natural frequency of the oscillating system consisting of oscillating ring and connecting members. This means that the frequency range that can be absorbed by the torsional vibration absorber can be adapted to the frequencies of the vibrations of the shaft to be absorbed by selecting the mass of the oscillating ring and the elasticity of the connecting members.

The oscillating ring is supported relative to the hub through connecting members disposed spaced from each other in the circumferential direction. In particular, the connecting members are equally spaced from each other. For example, three, four, six, eight or twelve connecting members are provided in order to support the oscillating ring relative to the hub.

The connecting members have two webs between which the middle portion is disposed. The middle portion is configured in a bead-shaped manner, so that, in particular, it has a greater thickness, which can also be referred to as width in the circumferential direction, than the webs. Preferably, the middle portion protrudes in the circumferential direction from the webs, and in particular on both sides of the connecting member. The connecting member is connected via the webs with the hub and the oscillating ring.

The advantage of the bead-shaped configuration of the connecting member becomes apparent particularly when the webs are made particularly short. During a vibration of the oscillating ring relative to the hub, the stiffness or spring constant is different in the radial direction and in the circumferential direction. If the oscillating ring is deflected relative to the hub in the radial direction, the bead-shaped middle portion determines the spring constant of the connecting member. The result of the bead-shaped configuration of the middle portion is a high spring constant and thus a high natural frequency of the oscillating system consisting of the oscillating ring and the connecting members. Thus, higher frequencies can be absorbed in the radial direction. The high spring constant of the connecting member in the radial direction is also advantageous in that the torsional vibration absorber exhibits a good unbalance behavior. The high radial stiffness reduces the radial deflection of the oscillating ring relative to the hub, so that the oscillating ring drifts less in the radial direction. This reduces unbalances on the torsional vibration absorber.

Especially in the case of connecting members with short webs, the webs of the connecting members make the primary contribution in elastically supporting the oscillating ring on the hub if the oscillating ring is deflected relative to the hub in the circumferential direction, because the bead-shaped middle portion is able to roll off during a movement of the oscillating ring in the circumferential direction relative to the hub. Because the webs are configured to be thin in comparison to the bead-shaped middle portion, the spring constant is low in the circumferential direction due to the connecting member. Thus, vibrations with low frequencies can be absorbed in the circumferential direction, which are, in particular, smaller than the frequencies that can be absorbed in the radial direction.

Thus, the torsional vibration absorber according to the invention is advantageous in that different frequencies can be absorbed both in the circumferential direction and in the radial direction. Moreover, the torsional vibration absorber according to the invention exhibits a good unbalance behavior. For example, vibrations with a frequency in the range of 85 Hz can be absorbed in the circumferential direction, while vibrations in the range of 200 Hz can be absorbed in the radial direction. This is advantageous particularly in the motor vehicle field in the case of joint shafts, because the frequencies there are different in the radial direction and in the circumferential direction. The torsional vibration absorber according to the invention is useful also in the case of an unbalance due to the shafts overspinning.

Advantageously, the connecting members are biased in the radial direction. Biasing preferably takes place by compression of the connecting members in the radial direction. In the process, the annular gap between the oscillating ring and the hub is reduced, so that the connecting members are compressed in the radial direction. In particular, the middle portion of the connecting members then contacts both the hub and the oscillating ring, so that the spring constant of the connecting members increases in the radial direction. Since the connecting members are able to roll off in case of the oscillating ring moving relative to the hub in the circumferential direction, the webs are the determining factor for the stiffness in the circumferential direction preferably even in the case of a compression of the connecting members in the radial direction. In case of a radial bias, the above-mentioned advantages of the torsional vibration absorber become particularly evident.

It is preferred that the bias is selected in such a manner that the connecting member remains biased if the oscillating ring is deflected to the maximum possible extent relative to the hub.

This means that the connecting member remains, in particular, compressed even at the maximum deflection possible of the oscillating ring relative to the hub. Thus, the connecting member is always subjected to a pressure load. Thus, it is possible to avoid that the connecting member is alternately subjected to a tensile and a pressure load in case of a deflection of the oscillating ring relative to the hub in the radial direction. It was found that the connecting member has a reduced service life in case of an alternating tensile and pressure load. Therefore, this selected type of biasing is advantageous in that the service life of the connecting member, and thus of the torsional vibration absorber, is particularly long.

It is preferred that the web has a first thickness in the circumferential direction and that the middle portion has a second thickness in the circumferential direction, the second thickness being twice to five times as great as the first thickness.

It is preferred that the oscillating ring is disposed in a moveable manner relative to the hub. Each web has a first thickness, and the middle portion has a second thickness. In particular, the thickness is measured in the circumferential direction. Then, the second thickness is preferably greater than the first thickness. The webs can be configured to be of equal thickness or different thicknesses. If the webs are configured to have different thicknesses, the first thickness is preferably the thickness of the thicker web.

It is preferred that the connecting members are vulcanized into the annular gap.

This constitutes a particularly simple and, in particular, cost-effective way of inserting and attaching the connecting members into the torsional vibration absorber.

Advantageously, an outer face of the hub and/or an inner face of the oscillating ring is provided with a coating. The coating preferably also consists of an elastomeric material, and also preferably from the same elastomeric material as the connecting members. The coating offers the possibility of damping impacts of the oscillating ring on the hub, in particular using the pin described later, in the case of large deflections.

It is preferred that the hub has a stop protruding outwards in the radial direction, and that preferably the oscillating ring has a counter stop protruding inwards in the radial direction. It is further preferred that the stop and the counter stop are spaced from each other in the circumferential direction and intersect in the radial direction.

Advantageously, the stop and/or the counter stop are made from the same material as the coating and, in particular, formed as a single piece therewith. The stop and the counter stop are provided in order to limit the deflection of the oscillating ring relative to the hub in the circumferential direction. The distance in the circumferential direction between the stop and the counter stop in this case determines the amplitude of the maximum deflection in the circumferential direction. In this case, the stop and counter stop overlap in the radial direction when the two are adjacent each other, so that they contact each other in the case of maximum deflection in the radial direction. The limitation of the deflection of the oscillating ring relative to the hub in the circumferential direction serves for avoiding damage to the connecting members due to too great an extension. In particular, the stop and the counter stop are disposed in such a way that the connecting members are always subjected to a pressure load during the thus-defined maximum deflection in the circumferential direction. In this manner, alternating loads on the connecting members that may have a negative effect on the life of the connecting members are avoided even in the case of deflection in the circumferential direction.

It is preferred that the torsional vibration absorber has at least one, in particular round, pin which is disposed between the hub and the oscillating ring, with the extent of the pin in the radial direction preferably being smaller than the distance between the hub and the oscillating ring in the radial direction.

The distance between the hub and the oscillating ring in the radial direction corresponds to the length of the annular gap in the radial direction. The size of the annular gap in the radial direction minus the extent of the pin in the radial direction yields a length corresponding to the maximum deflection of the oscillating ring relative to the hub in the radial direction. Accordingly, the pin preferably serves for limiting the maximum deflection of the oscillating ring relative to the hub in order to avoid damage to the connecting members. However, due to the bead-shaped configuration of the middle portions and the high elasticity constant in the radial direction connected therewith, it is possible to omit the pins.

Advantageously, the extent of the pin in the radial direction is selected in such a way that the coating is biased in the radial direction, with the pin preferably rolling between the stop and counter stop if the oscillating ring is deflected relative to the hub in the circumferential direction.

If the oscillating ring is deflected relative to the hub in the radial direction, there are therefore no impacts on the pin, because the coating and the pin are in contact with each other.

The invention is characterized in more detail below with reference to exemplary embodiments.

A torsional vibration absorber 10 comprises a hub 12 and an oscillating ring 14. The oscillating ring 14 is connected to the hub 12 via four connecting members 16 which are disposed offset in the circumferential direction U and disposed in an annular gap 15 defined between the hub 12 and the oscillating ring 14.

The hub has an attachment portion 18 in which three attachment holes 20 are disposed. The attachment holes 20 serve for attaching the torsional vibration absorber 10 to a shaft. For this purpose, screws or bolts, for example, can be inserted through the attachment holes 20 in order to rigidly fixate the torsional vibration absorber 10 on the shaft. Alternatively, the torsional vibration absorber 10 can be fixated by means of a press-fit with the attachment portion 18.

Furthermore, stops 22 protruding in the radial direction R from the hub 12 are attached to the hub. In addition, the hub 12 is provided on an outer face with a coating 24.

Figure 2:
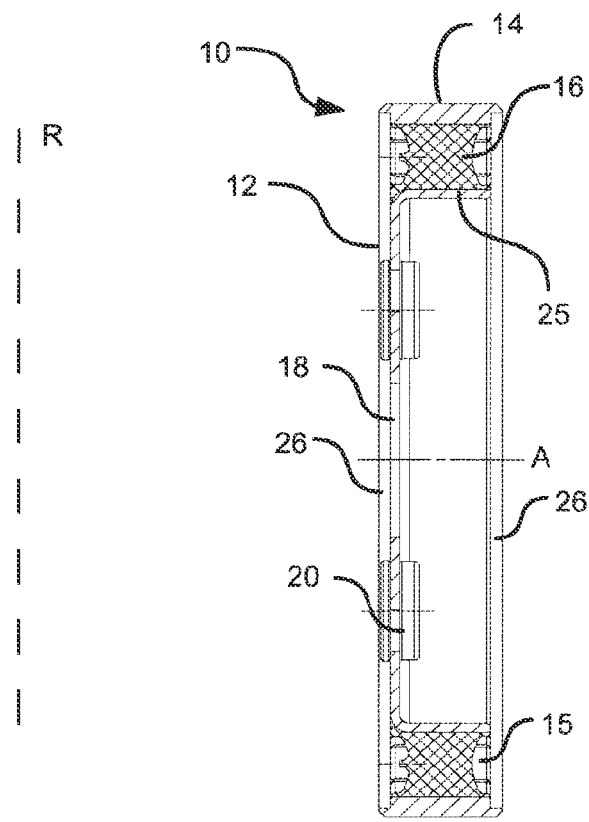
FIG. 2 shows a cross sectional view along the line D-D of FIG. 1.

As shown in FIG. 2, the hub has a peripheral region 25 in contact with the attachment portion 18. The connecting members 16, the stops 22 and the coating 24 are disposed on the peripheral region 25 and, in particular, in the annular gap 15. The torsional vibration absorber 10 comprises two covers 26 that position pins 34 in the axial direction A. The oscillating ring 14 is disposed concentrically with and movably in relation to the hub 12 and the covers 26.

The oscillating ring 14 comprises counter stops 28 protruding in the radial direction R from the oscillating ring 14 inwards into the annular gap 15. Moreover, the oscillating ring 14 has on its inner face another coating 24.

Figure 3:
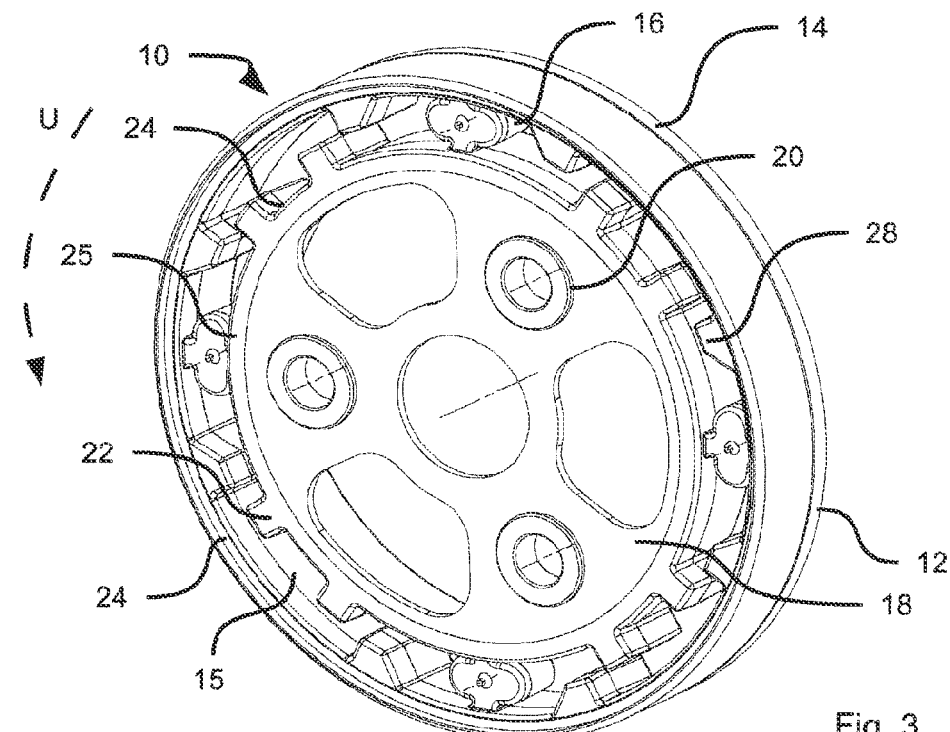
FIG. 3 shows a perspective view of the torsional vibration absorber from FIGS. 1 and 2.
Figure 4:
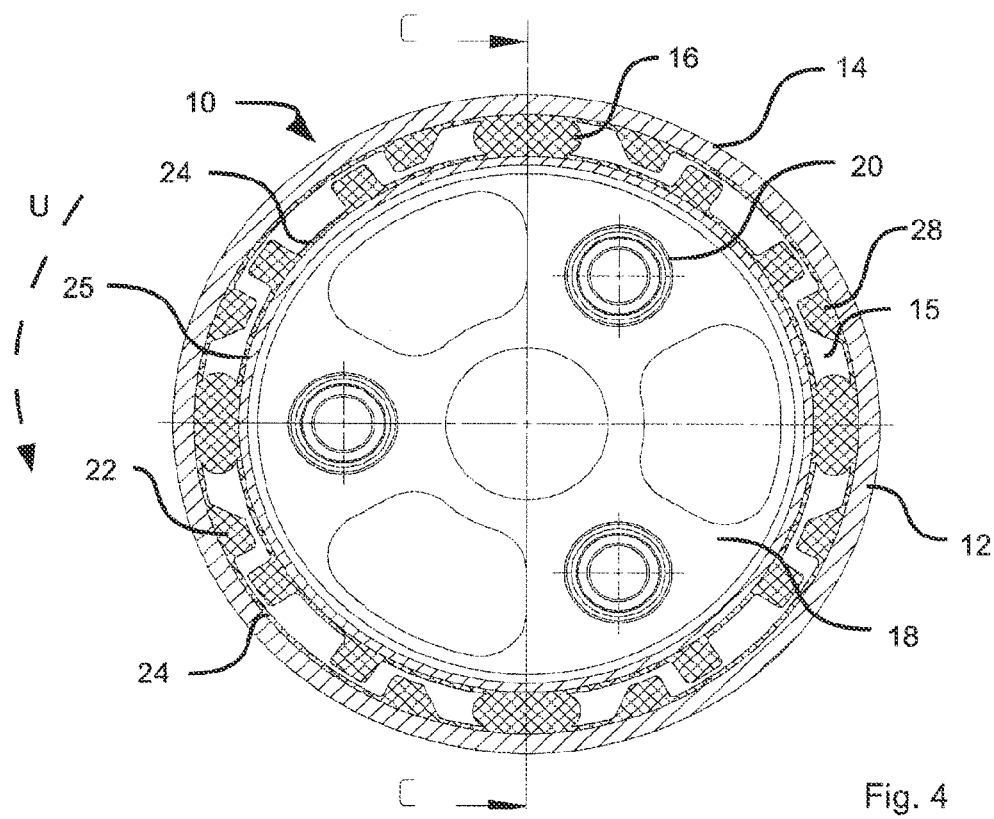
FIG. 4 shows a cross sectional view of the torsional vibration absorber from FIG. 1 in the biased state.
Figure 5:
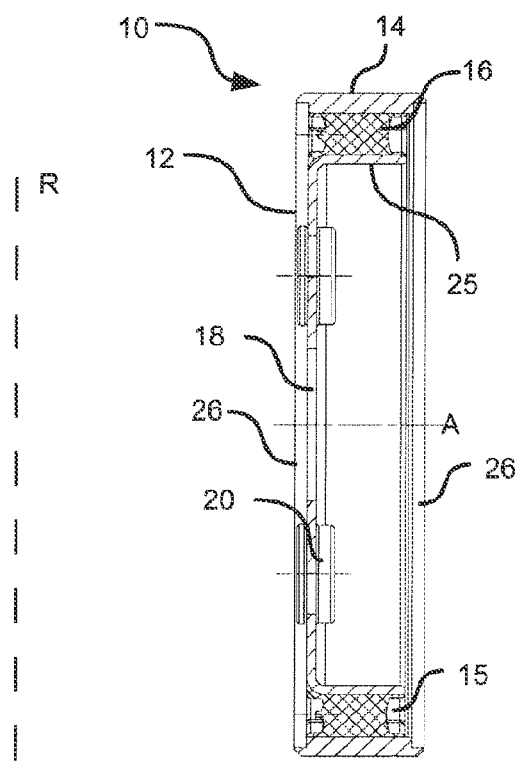
FIG. 5 shows a cross sectional view of the torsional vibration absorber along the line C-C from FIG. 4.

The connecting members 16, the stop 22, the counter stop 28 and/or the coating 24 are made from an elastomeric material, in particular rubber. The stop 22 and the counter stop 28 are spaced from each other in the circumferential direction U and, in the biased state of the torsional vibration absorber 10, overlap in the radial direction R, as this is shown in FIG. 3.

Figure 9:
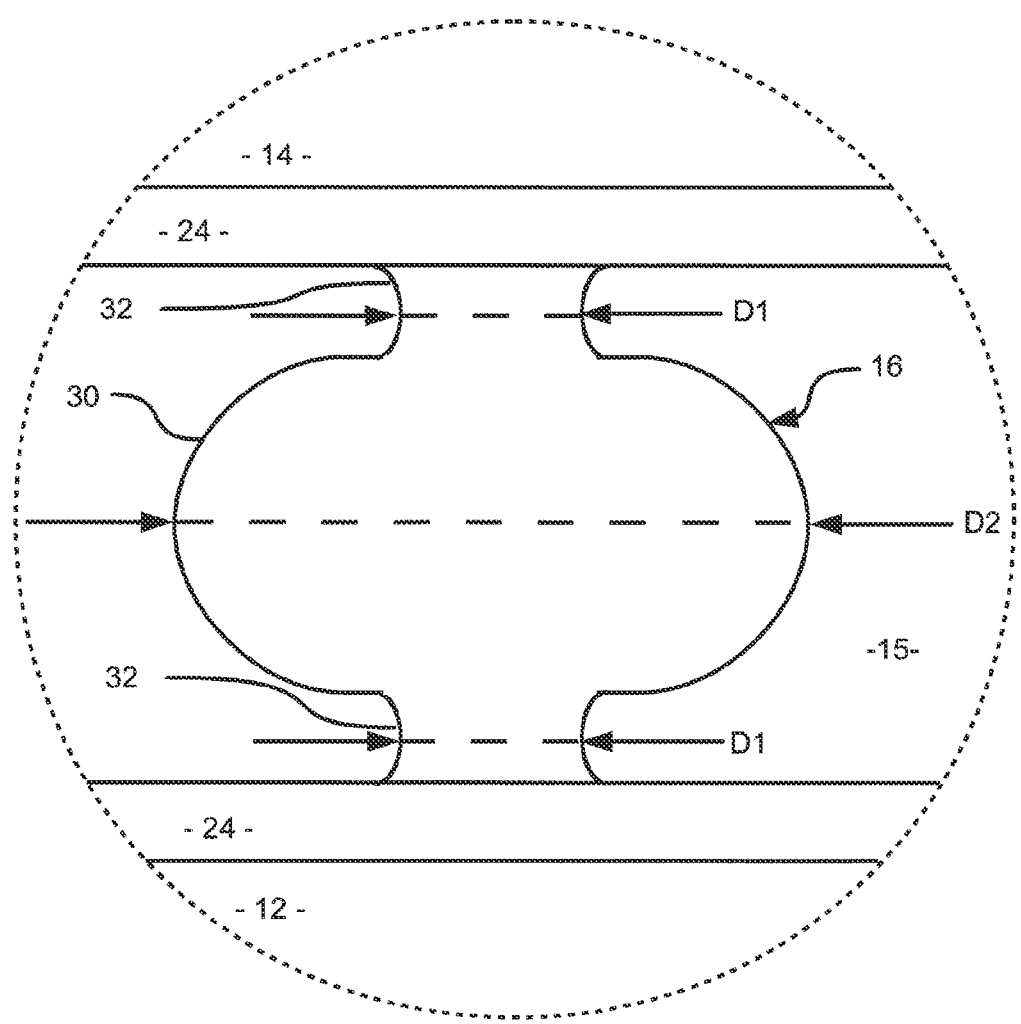
FIG. 9 shows an enlarged side view of a connecting member from FIG. 1.

As is shown particularly well in FIG. 9, the connecting member 16 has a middle portion 30 and two webs 32. The webs 32 are each attached to the coating 24 of the hub 12 and the oscillating ring 14. The webs have a first thickness D1, and the middle portion 30 has a second thickness D2. The thickness is measured in the circumferential direction U in each case. The web 32 facing towards the hub 12 and the web 32 facing towards the oscillating ring 14 have the same thickness. The second thickness D2 of the middle portion 30 is greater than the first thickness D1 of the webs 32. The connecting member 16 is formed as a single piece; that means that the middle portion 30 and the webs 32 are made from a single piece. In particular, the connecting member 16, with the coating 24, is vulcanized in between the hub 12 and the oscillating ring 14, as is easily apparent in FIG. 9.

As shown in FIGS. 4, 5, 6, 7 and 8, the connecting member 16 is biased in the radial direction R in the biased state. In particular, the connecting member 16 is biased in such a way that the connecting member 16 is still biased if the oscillating ring 14 is deflected to the maximum extent in the radial direction R relative to the hub 12.

Figure 7:
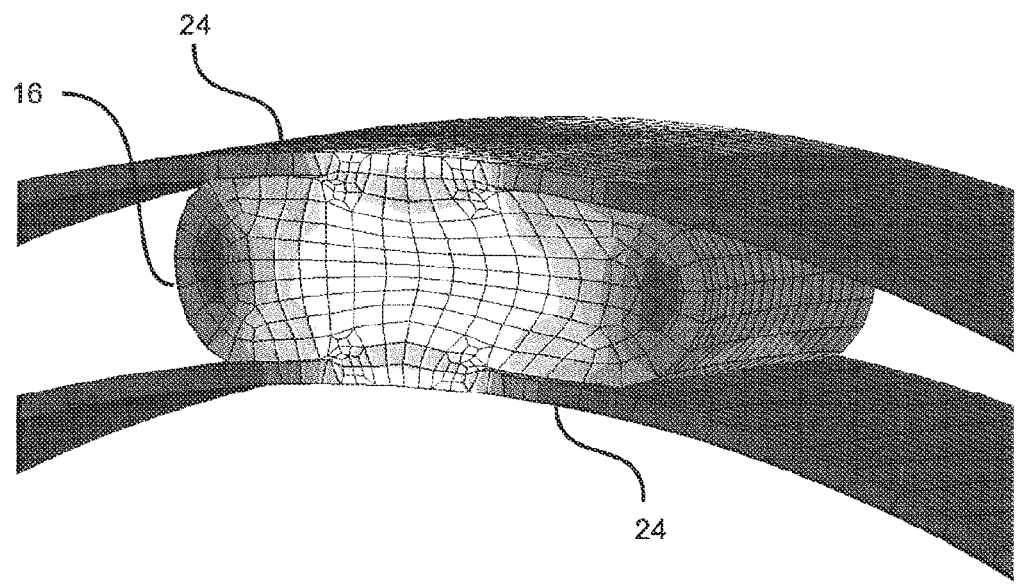
FIG. 7 shows a view depicting the stress conditions in a connection member.

FIG. 7 schematically shows the connecting member 16 in the biased state, with the oscillating ring 14 not being deflected in the circumferential direction U relative to the hub 12. This results in a load in the connecting member 16 as it is shown in FIG. 7 by means of the pressure force lines.

Figure 8:
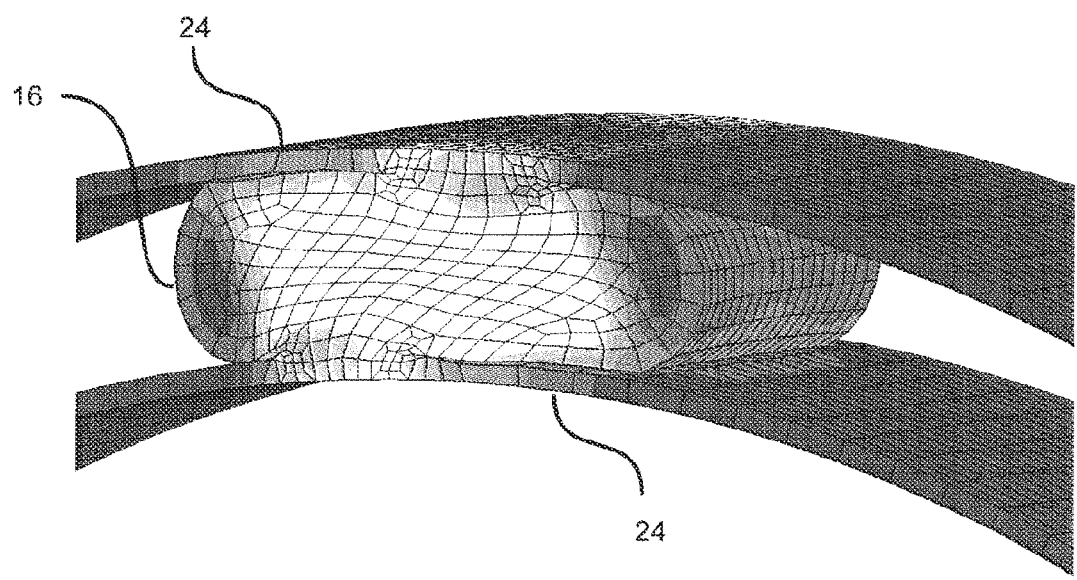
FIG. 8 shows an equivalent illustration of FIG. 7, wherein the connecting member is depicted in the rolled-off state, and an enlarged side view of a connecting member.

If the oscillating ring 14 is now deflected relative to the hub 12 in the circumferential direction U, the connecting member 16 rolls off, so that the result is the pressure distribution shown in FIG. 8. In particular, the spring constant of the connecting member 16 in the circumferential direction U is determined by the webs 32, because the middle portion 30 provides hardly any restoring force in the circumferential direction U due to the rolling. Only when the oscillating ring 14 is deflected relative to the hub 12 in the radial direction R, the middle portion 30 makes a decisive contribution to the stiffness of the connecting member 16. Due to the greater second thickness D2 of the middle portion 30 as compared to the first thickness D1 of the webs 32, the middle portion 30 is disposed with a wide surface area between the oscillating ring 14 and the hub 12, so that a high spring constant in the radial direction R results.

This means that vibrations in the radial direction R can be absorbed in a higher frequency range by means of the torsional vibration absorber 10 compared with vibrations in the circumferential direction U.

Figure 6:
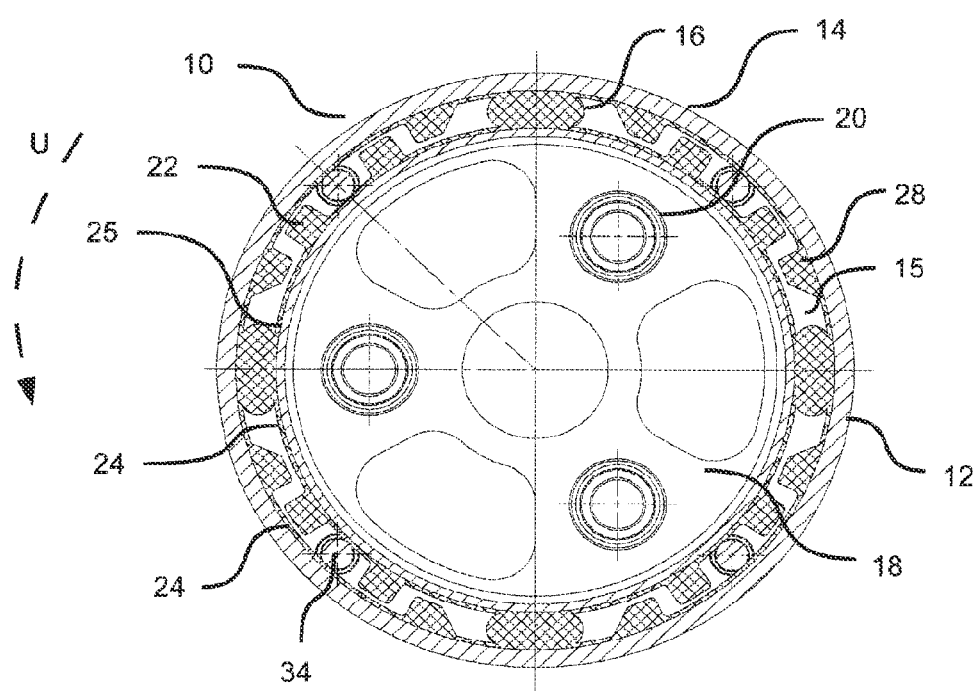
FIG. 6 shows a cross sectional view of a torsional vibration absorber in the biased state with pins.

FIG. 6 shows another embodiment of the torsional vibration absorber 10. The latter has the same features as the torsional vibration absorber shown in FIGS. 1 to 5, and additionally comprises four pins 34 disposed in the radial direction R between the hub 12 and the oscillating ring 14. The pins 34 are made from a material with an elasticity that is lower than the elasticity of the coating 24. The pins 34 are disposed to limit the deflection of the oscillating ring 14 relative to the hub 12 in the radial direction R to a maximum deflection. The maximum deflection depends on the extent of the pins 34 in the radial direction R. The coating 34 is biased by the pins 34, so that an impact of the pins 34 on the oscillating ring 14 is avoided. In the event of a deflection in the circumferential direction U, the pins 34 roll between the stops 22 and the counter stops 28.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGN LIST

10 Torsional Vibration Absorber
12 Hub
14 Oscillating ring
15 Annular gap
16 Connecting member
18 Attachment portion
20 Attachment hole
22 Stop
24 Coating
25 Peripheral region
26 Cover
28 Counter stop
30 Middle portion
32 Web
34 Pin
A Axial direction
D1 First thickness
D2 Second thickness
R Radial direction
U Circumferential direction

What is claimed is:

1. A torsional vibration absorber, comprising:
a hub for attachment to a shaft; and
an oscillating ring that is disposed concentrically with the hub and, together with the hub, delimits an annular gap;
wherein the hub and the oscillating ring are connected via connecting members made from an elastomeric material, the connecting members being offset in a circumferential direction and disposed in the annular gap;
wherein the connecting members each include a middle portion disposed between two single webs radially aligned with each other, the connecting members being connected to the oscillating ring and to the hub via the webs, the middle portion having a second thickness in the circumferential direction that is greater than a first thickness in the circumferential direction of each of the webs.

2. The torsional vibration absorber according to claim 1, wherein the connecting members are biased in a radial direction.

3. The torsional vibration absorber according to claim 2, wherein the bias is selected such that the connecting member remains biased when the oscillating ring is displaced to the maximum possible extent relative to the hub.

4. The torsional vibration absorber according to claim 1, wherein the second thickness is two to five times greater than the first thickness.

5. The torsional vibration absorber according to claim 1, wherein the connecting members are vulcanized into the annular gap.

6. The torsional vibration absorber according to claim 1, wherein at least one of an outer face of the hub or an inner face of the oscillating ring includes a coating.

7. The torsional vibration absorber according claim 1, wherein the hub has a stop protruding outwards in a radial direction, and the oscillating ring has a counter stop protruding inwards in the radial direction.

8. The torsional vibration absorber according to claim 7, wherein the stop and the counter stop are spaced from each other in the circumferential direction and intersect in the radial direction.

9. The torsional vibration absorber according to claim 1, wherein at least one pin is disposed between the hub and the oscillating ring, with the extent of the pin in a radial direction is smaller than the distance between the hub and the oscillating ring in the radial direction.

10. The torsional vibration absorber according to claim 9, wherein at least one of an outer face of the hub or an inner face of the oscillating ring includes a coating, wherein the hub has a stop protruding outwards in a radial direction, and the oscillating ring has a counter stop protruding inwards in the radial direction, and wherein the extent of the pin in the radial direction is selected such that the coating is biased in the radial direction, with the pin rolling between the stop and the counter stop when the oscillating ring is deflected relative to the hub in the circumferential direction.

11. The torsional vibration absorber according to claim 1, wherein the torsional vibration absorber is for a joint shaft.

12. The torsional vibration absorber according to claim 9, wherein the at least one pin is round.

* * * * *